United States Patent [19]

Lehn et al.

[11] 4,116,887

[45] Sep. 26, 1978

[54] ANTIONIC POLYMERIZATION

[75] Inventors: Jean-Marie Lehn, Strasbourg; François Schué, Lutzelhouse; Sylvia Boileau, Paris; Bernd Kaempf, Strasbourg; Alain André Cau, Chateauneuf sur Loire; Jean Robert Moinard, Vert le Petit; Serge Fernand Raynal, Villejuif, all of France

[73] Assignee: Societe Nationale des Poudres et Explosifs, France

[21] Appl. No.: 539,729

[22] Filed: Jan. 9, 1975

Related U.S. Application Data

[62] Division of Ser. No. 401,119, Sep. 26, 1973, Pat. No. 3,890,278.

[30] Foreign Application Priority Data

Oct. 3, 1972 [GB] United Kingdom ............... 45482/72
Jul. 30, 1973 [GB] United Kingdom ............... 36257/73

[51] Int. Cl.² ..................... C08G 65/12; C08G 63/10; C08G 75/06; C08G 77/08
[52] U.S. Cl. ............................... 260/2 A; 252/431 N; 260/615 B; 260/823; 260/824 R; 260/827; 260/830 R; 260/836; 260/857 UN; 260/874; 528/37; 528/14; 528/356; 528/358; 528/355; 528/379; 528/380; 528/408; 528/413; 526/204; 526/180; 526/205; 526/340.2; 526/346; 526/329.7; 526/352.2
[58] Field of Search ................. 260/2 A, 2 R, 2 EN, 260/615 B, 2 XA, 2 D, 465 R, 47 A, 67 FP, 78 L, 78 P, 79.7, 78.3 R, 823, 824 R, 827, 830 R, 836, 857 UN, 874; 526/180, 183, 204

[56] References Cited

U.S. PATENT DOCUMENTS

| | | | |
|---|---|---|---|
| 3,159,647 | 12/1964 | Poppelsdorf | 260/309.7 |
| 3,412,073 | 11/1968 | Mogsed | 260/78.3 |
| 3,462,398 | 8/1969 | Wagner et al. | 260/78.3 |
| 3,532,645 | 10/1970 | Schulze et al. | 260/2 |
| 3,536,679 | 10/1970 | Langer | 260/83.1 |
| 3,560,450 | 2/1971 | Curotti | 260/78.3 |

OTHER PUBLICATIONS

Bywater, "Anionic Polymerization", at pp. 27–30, 47–53, & 64–69, vol. 4, Progress in Polymer Science, Edited by A.D. Jenkins, Pergamon, Oxford & New York, 1974.

Furukawa et al., "Polymerization of Aldehydes and Oxides", Interscience, 1963, pp. 155-161 & 167-169.

Miki et al., "Polyalkylene Oxide", Chemical Abstracts 73, 15498z (1970).

*Primary Examiner*—Harold D. Anderson
*Assistant Examiner*—E. A. Nielsen
*Attorney, Agent, or Firm*—Bucknam and Archer

[57] ABSTRACT

A novel process for polymerization or copolymerization of monomers is described, according to which the reaction is carried out in the presence of an anionic initiator and a macroheterocyclic complexing agent of formula

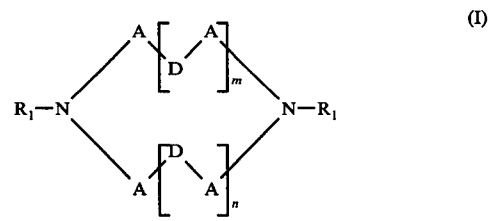

(I)

in which:
each $R_1$ is a hydrogen atom, a hydrocarbon group or an alkoxycarbonyl group, or the two $R_1$ together can form a group of the general formula:

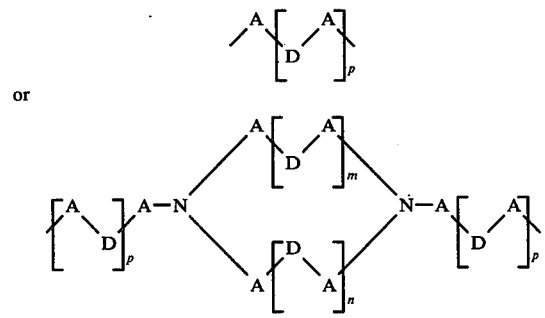

that is to say forming a third bridge between the two nitrogen atoms in the molecule,
A is a hydrocarbon group,
D is an oxygen or sulfur atom or a hydrocarbon group, with the proviso that at least two of the groups D are oxygen or sulfur atoms and that, if each $R_1$ is hydrogen, a hydrocarbon group or an alkoxycarbonyl group, one of these two groups D is oxygen or sulfur and the other is oxygen,
$n$ and $p$ are integers ranging from 1 to 3, and
$m$ is 2 or 3.

28 Claims, No Drawings

ANTIONIC POLYMERIZATION

This is a division, of application Ser. No. 401,119 filed Sept. 26, 1973, now U.S. Pat. No. 3,890,278, issued June 17, 1975.

The present invention relates to the anionic polymerization of monomers by basic initiators in an organic solvent medium.

The reaction mechanism of anionic polymerization comprises three main steps:

a — an initiation step in which the monomer is activated by attachment of the anion provided by the initiator to a molecule of the monomer, b — a propagation step in which growth of the chains takes place by reaction of the activated molecule with a new monomer molecule and so on, and c — an interruption step in which the growth of the chains is stopped through disappearance of the activated centres.

The growth of the chains is uniform; branched chains, due to growth of a side chain on the main chain, are rare and sometimes impossible so that the regularity of the structure of the polymers obtained by anionic polymerization often imparts noteworthy physical properties to the polymers.

The influence of the polarity of the medium on the initiation reaction and growth reaction is very great. In the case of the propagation reaction, the speed is greatly increased in polar media. This is due to the increase in the possibilities of solvation of the ion pairs by the solvent, which can increase their possible charge separation and to the effect of the dielectric constant, which considerably increases the dissociation into free ions. Hence, the growth reaction is strongly influenced by the thermodynamically distinct species which are in equilibrium with one another.

According to the present invention, anionic polymerization initiators are used in combination with certain macro-heterocyclic complexing agents. These complexing agents not only increase the basic character of the anionic polymerization initiators but also have a considerable influence on the species which are present.

The use of these complexing agents has the following advantages:

polymers of high molecular weight can be obtained; the range of solvents which can be used is increased; certain monomers which have hitherto been difficult to polymerize anionically, can now be so polymerised; initiators can be used which have hitherto been unsuitable for use with certain types of monomers; and the development of new initiator systems.

The macro-heterocyclic complexing agents used in the present invention can be represented by the following general formula:

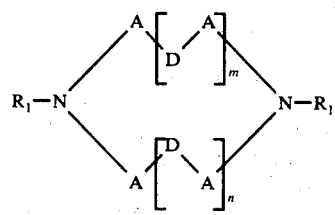

(I)

in which:

each $R_1$ is a hydrogen atom, a hydrocarbon group or an alkoxycarbonyl group, or the two $R_1$ together can form a group of the general formula:

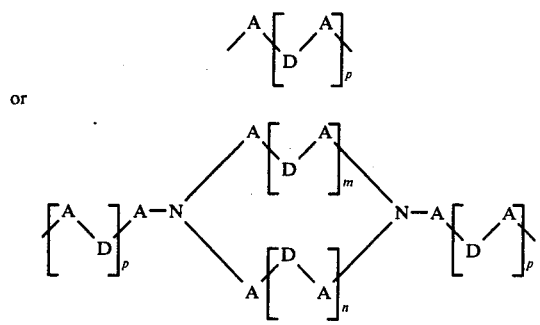

that is to say forming a third bridge between the two nitrogen atoms in the molecule, A is a hydrocarbon group, D is an oxygen or sulfur atom or a hydrocarbon group, with the proviso that at least two of the groups D are oxygen or sulfur atoms and that, if each $R_1$ is hydrogen, a hydrocarbon group or an alkoxycarbonyl group, one of these two groups D is oxygen or sulfur and the other is oxygen, $n$ and $p$ are integers ranging from 1 to 3, and $m$ is 2 or 3.

The hydrocarbon groups represented by A and D preferably have 2 to 12 carbon atoms and are especially: straight-chain or branched alkylene and alkenylene groups with 2 to 8 carbon atoms, such as the ethylene, propylene, butylene and hexylene groups and their unsaturated analogues; cycloalkylene groups such as cyclohexylene and cycloheptylene groups and their unsaturated analogues; corresponding cycloalkylene-alkyl or dialkyl groups such as cyclohexylene-dimethyl, and aromatic groups such as phenylene and phenylene-alkyl or dialkyl groups preferably phenylene-dimethyl. The groups A which are adjacent to the nitrogen atom preferably have an aliphatic portion attached to N.

The hydrocarbon groups represented by $R_1$ preferably have 1 to 12 carbon atoms, and are especially straight-chain or branched alkyl groups with 2 to 8 carbon atoms. Other typical examples are cycloalkyl, aralkyl and aryl groups. The preferred alkoxycarbonyl groups represented by $R_1$ in the general formula (I) are those with up to 10 carbon atoms.

The preferred macro-heterocyclic compounds are those with the typical configurations shown below:

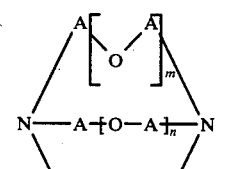

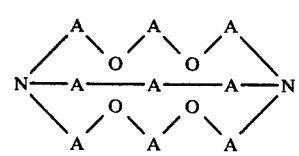

-continued

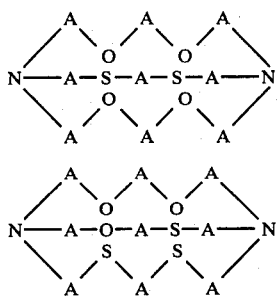

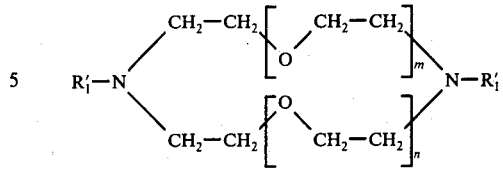

(II)

in which:
the two substituents $R_1'$ together represent one of the following chain links forming a third bridge between the two nitrogen atoms of the molecule

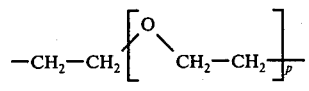

or

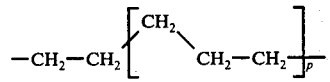

or

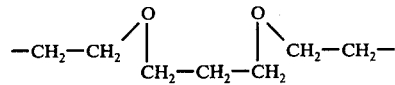

or

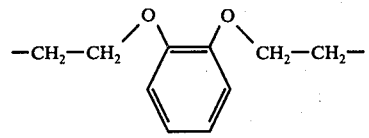

or

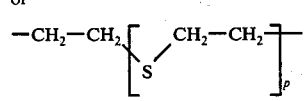

or

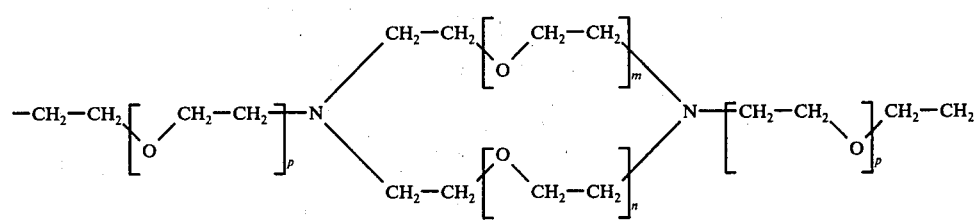

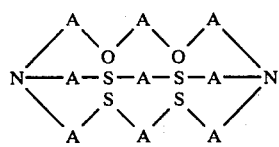

Examples of macro-heterocyclic compounds are those in which:

A = —CH$_2$—CHR—
A = —CH$_2$—CHR—CH$_2$ or —CHR—CH$_2$—CH$_2$— or

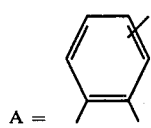

and R is a hydrocarbon radical.

More particularly, the preferred macro-heterocyclic compounds used in the present invention are represented by the following general formula:

and $n$, and $p$ are integers from 1 to 3 and $m$ is 2 or 3.
Typical examples of these compounds are the following:

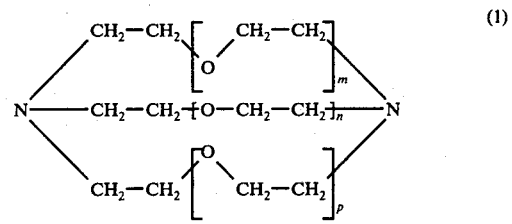

(I)

wherein $n$ and $p$ are integers from 1 to 3 and $m$ is 2 or 3, especially:
in the case of $m = 2$, $n = 1$ and $p = 1$ 1,10-diaza-4,7,13,18-tetraoxa-bicyclo[5,5,8]eicosane, referred to as compound [211]
in the case of $m = 2$, $n = 2$ and $p = 1$ 1,10-diaza-4,7,13,16,21-pentaoxa-bicyclo[8.8,5]tricosane, referred to as compound [221]

in the case of $m = 2$, $n = 2$ and $p = 2$ 1,10-diaza-4,7,13,16,21,24-hexaoxa-bicyclo[8,8,8]hexacosane, referred to as compound [222]

in the case of $m = 3$, $n = 2$ and $p = 2$ 1,13-diaza-4,7,10,16,19,24,27-heptaoxa-bicyclo[8,8,11]nonacosane, referred to as compound [322]

in the case of $m = 2$, $n = 2$ and $p = O$

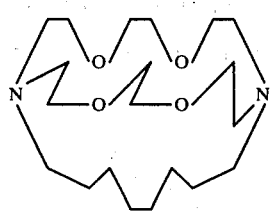

(2)

1,10-diaza-13,16,21,24-tetraoxa-bicyclo[8,8,8]hexacosane, referred to as compound [220]

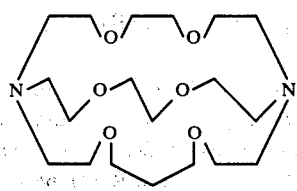

(3)

1,10-diaza-4,7,13,16,21,25-hexaoxa-bicyclo[8,8,9]heptacosane, referred to as compound [22p]

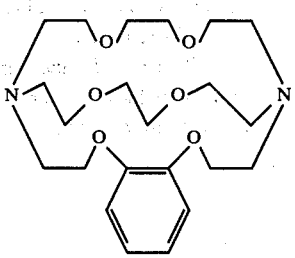

(4)

1,10-diaza-4,7,13,16,21,24-hexaoxa-5,6-benzo-bicyclo[8,8,8]hexacosane, referred to as compound [22B]

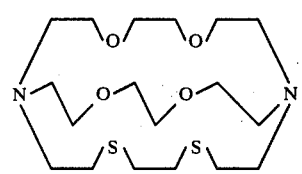

(5)

1,10-diaza-4,7,13,16-tetraoxa-21,24-dithia-bicyclo[8,8,8]hexacosane, referred to as compound [402S]

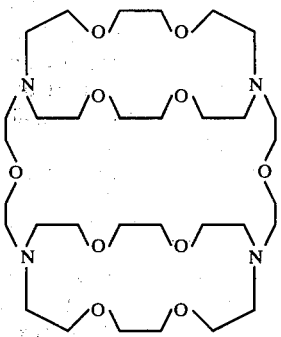

1,7,16,22-tetraaza-4,10,13,19,25,28,33,36,41,44-decaoxa-tricyclo [$20.8^{1,22}.8^{1,22}.8^{7,16}$]hexatetracontane, referred to as [T₂O]

These macro-heterocyclic compounds have an exceptional ability to form stable complexes with compatible cations. The bridges between the nitrogen atoms form, amongst themselves, a "cage" in which the cation is trapped (whence the name "cryptate" given to these complexes).

The capacity to form complexes and the stability of the complexes formed depend on the arrangement of the heteroatoms or groups surrounding the cation and on the relative diameters of the rings and of the cation. It results in a characteristic selectivity between cations and macro-heterocyclic compounds which is demonstrated in the present invention.

Each macro-heterocyclic molecule is capable of forming a complex with a cation. The value of the charge on the cation has no influence. These cations are generally inorganic cations.

The formation of cryptates has been established with the macro-heterocyclic compounds defined above and the stability constants have been measured. The results are summarized in Table I below.

TABLE I.

| Macro-cyclic* compound | Stability constant of cryptates (Log Ks) cation | | | | | | | |
|---|---|---|---|---|---|---|---|---|
| | $Li^+$ | $Na^+$ | $K^+$ | $Rb^+$ | $Cs^+$ | $Ca^{++}$ | $Sr^{++}$ | $Ba^{++}$ |
| Compound | | | | | | | | |
| [211] | 5.3 | 2.6 | <2 | <2 | <2 | 2.8 | <2 | <2 |
| [221] | 2.5 | 5.3 | 3.9 | 2 | <2 | 7 | 7.3 | 6.3 |
| [222] | <2 | 3.8 | 5.3 | 4.5 | <2 | 4.4 | 8 | 9.5 |
| [322] | <2 | 1.6 | 2.1 | 2.3 | — | — | 3.4 | 6 |
| [332] | <2 | <2 | <2 | <2 | <2 | <2 | <2 | 3.6 |
| [333] | <2 | <2 | <2 | <2 | <2 | <2 | <2 | — |

*solvent H₂O, temperature: 25° C ± 0.1° C.

In organic solvents, the stability of the cryptates is better still; thus, for compound [222], which preferentially complexes the potassium cation, the logarithm of the stability constant is greater than 9 in benzene.

The use of the macro-heterocyclic complexing agents defined by the formula I not only makes it possible very markedly to improve the activity of the anionic initiators which are active even under conventional polymerization conditions but also makes it possible to use new initiators which have hitherto proved inactive in this type of polymerization.

In fact, such complexing agents display noteworthy complex-forming properties towards metal cations, especially cations of group I and II of the periodic classification of the elements, provided by anionic initiators; these metal cations "become inserted" in the intramolecular cavities of the said complex-forming agents, with the formation of "cryptates".

As a result, the reactivity of the corresponding anions provided by the said initiators is very markedly increased due to the formation of none-intimate ion pairs and free ions.

In general terms, the macro-heterocyclic compounds of the general formula I can be used for the polymerization of all monomers capable of polymerizing by the conventional anionic polymerization process, and, in particular, of vinyl monomers, mono-olefinic monomers, diene monomers and heterocyclic monomers of the following types:

A. Mono-olefinic monomers and vinyl monomers of the general formula:

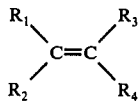 (A)

wherein $R_1$, $R_2$, $R_3$ and $R_4$ can be defined as follows:
$R_1=R_2=R_3=R_4=H$ (as in the case of ethylene)

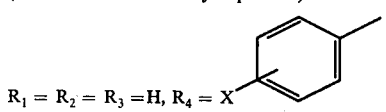

(as in the case of 4-methyl-1-pentene)

$R_1 = R_2 = R_3 = H, R_4 = X$ —⟨⟩ wherein X can be:
H (as in the case of styrene) Cl or Br in the ortho, meta or para positions (as in the case of chlorostyrene or bromostyrene) $OCH_3$ (as in the case of p-methoxystyrene) and $-C(-CH_3)_3$ (as in the case of p-tertiary butyl-styrene)

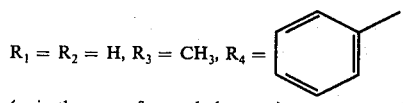

(as in the case of α-methylstyrene)

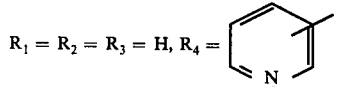

(as in the case of 2-vinylpyridine or 4-vinylpyridine)

$R_1=R_2=R_3=H$ and $R_4=Cl$ (as in the case of vinyl chloride) $R_1=R_2=R_3=H$ and $R_4=-C\equiv N$ (as in the case of acrylonitrile) or $R_4=-C-O-R'$ or $R_4 = -\underset{\underset{O}{\|}}{C}-O-R'$ R′ being an alkyl or cycloalkyl radical (as in the case of alkyl or cycloalkyl acrylates) $R_1=R_2=H$, $R_3=CH_3$, with $R_4=-C\equiv N$ (as in the case of methacrylonitrile)

or $R_4 = -\underset{\underset{O}{\|}}{C}-COR'$

R′ being alkyl or cycloalkyl radical (as in the case of alkyl methacrylate or cycloalkyl methacrylate)

R″ = alkyl (as in the case of the vinyl ketones)

B. Diene monomers of the general formula

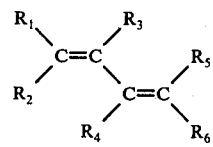

wherein $R_1$, $R_2$, $R_3$, $R_4$, $R_5$ and $R_6$ can be defined as follows:

$R_1=R_2=R_3=R_4=R_5=R_6=H$ (as in the case of 1,3-butadiene)

$R_1=R_2=R_4=R_5=R_6=H$ and $R_3$ can be a substituent such as:

alkyl (as in the case of 2-alkyl-1,3-butadienes)
or aryl (as in the case of 2-aryl-1,3-butadienes)
or chloro (as in the case of 2-chloro-1,3-butadiene)

$R_2=R_3=R_4=R_5=R_6=H$ and $R_1$ can be a substituent such as:

alkyl (as in the case of 1-alkyl-1,3-butadienes)
or aryl (as in the case of 1-aryl-1,3-butadienes)
or nitrile (as in the case of 1-cyano-1,3-butadiene)
or nitro (as in the case of 1-nitro-1,3-butadiene)

$R_1=R_2=R_5=R_6=H$ and $R_3=R_4=-CH_3$ (as in the case of 2,3-dimethyl-1,3-butadiene)

$R_1=CH_3$ and $R_2=R_3=R_4=R_5=R_6$ and can be either H (as in the case of 1,3-pentadiene) and/or alkyl (as in the case of alkyl-1,3-butadiene)

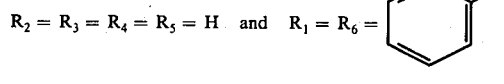

(as in the case of 1,4-diphenyl-1,3-butadiene).

C. Heterocyclic monomers of the general formula

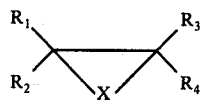 (C)

wherein X can be an oxygen hetero-atom (epoxides) or sulfur hetero-atom (episulfides), $R_1$, $R_2$, $R_3$, $R_4$ being a hydrogen atom or an alkyl or cycloalkyl or aryl radical; a cyclohexene sulfide

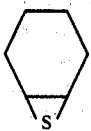

or of the general formula

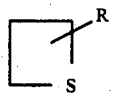

(as in the case of the thietanes), wherein R can be an alkyl or aryl radical, and also lactones of general formula

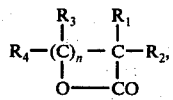

n being an integer from 1 to 4 an in particular β-propiolactone, ε-caprolactone and pivalolactone and siloxanes such as hexamethylcyclotrisiloxane and octamethylcyclotetrasiloxane.

The compounds of the general formula I are used for the anionic polymerization of the monomers in the presence of basic initiators which are chosen from amongst the following metals, salts and metal complexes:

metals of groups I and II (in particular Li, Na, K and Cs);

hydroxides of metals of group I (in particular KOH);

alcoholates of metals of group I and II, it being possible for the alcohol to be an alkanol or cycloalkanol or an aromatic alcohol (especially alkali metal tert.-butylate, alkali metal tert.-amylate and alkali metal n-amylate);

amides of metals of groups I and II of the type

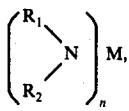

it being possible for $R_1$ and $R_2$ to be hydrogen or an alkyl, cycloalkyl or aryl radical, whilst M is a metal of group I and II (especially sodium -or potassium- carbazyl) n beng the valency of the metal compounds $MX_n$, wherein M represents a metal of group I or II, as well as the corresponding sub-groups, n being the valency of the metal, whilst X can be a thiocyanate or acetate group (especially potassium thiocyanate, and potassium acetate).

monofunctional and difunctional organo-metallic derivatives of the type RM, wherein M represents a metal of group I or II and R can be an alkyl, cycloalkyl or aryl radical (especially n-butyl lithium, t-butyl lithium), aromatic complexes of the metals of groups I and II (especially naphthalene-sodium, naphthalene-lithium and naphthalene-potassium); and living monofunctional and difunctional oligomers and polymers (especially α-methylstyrene - K or -Na, 1,1-diphenylethylene-Na, propylene polysulphide-Na and polystyrene-Li).

The value of the living polymer is that it is much more stable than the original initiator and allows better control of the polymerization as well as of the manufacture of the copolymers.

The polymerization or copolymerization according to the invention is carried out in non-polar or slightly polar organic solvents, especially:

linear and cyclic saturated hydrocarbons,
aromatic hydrocarbons,
linear and cyclic ethers such as dioxane, dimethoxymethane, tetrahydropyran, dimethoxyethane and tetrahydrofuran.

The non-polar or slightly polar organic solvents used according to the present invention are preferably organic solvents of dielectric constant not exceeding 10. These solvents have the advantage over solvents of higher polarity that their cost price is lower, that they are safer to use and that they are more easily purified (separation of the various fractions and retention of the initial purity).

Table II gives some typical examples of solvents used.

TABLE II

| Solvent | Dielectric constant | Temperature °C |
|---|---|---|
| Hexane | 1.879 | 25° |
| Heptane | 1.924 | 20° |
| Cyclohexane | 2.023 | 20° |
| Dioxan | 2.209 | 25° |
| Benzene | 2.275 | 25° |
| Toluene | 2.379 | 25° |
| Dimethoxymethane | 2.645 | 20° |
| Ethyl ether | 4.335 | 20° |
| Tetrahydropyran | 5.61 | 25° |
| 1,2-Dimethoxyethane | 7.20 | 25° |
| Tetrahydrofuran | 7.58 | 25° |

These solvents can be used individually or as mixtures.

According to the present invention, polymerization is carried out in vacuo or in an inert gas atmosphere which in practice is nitrogen or argon.

According to a preferred form of carrying out the process of the present invention, the anionic initiator is first reacted with the complex-forming agent of the formula I in a non-polar or slightly polar solvent medium.

This reaction is very fast under normal temperature and pressure conditions or in vacuo and gives an activated complex in which the metal ion provided by the initiator is inserted in the cage consisting of the macroheterocyclic compound of the formula I.

Preferably, the compound of the formula (I) to be used depends on the radius of the metal cation of the anionic initiator.

The complex-forming agent is used in an at least equimolar amount and preferably in excess relative to the anionic initiator.

The activated complex thus obtained is now used for the polymerization of monomers under the working conditions enumerated above.

As has already been mentioned previously, it is possible, by virtue of the use of the complex-forming agents defined by the formula I, to employ new initiators, which makes it possible to attach valuable functional groups to one of the ends of the macromolecule. Thus it is possible to envisage the initiation (of the polymerization) of ethylene oxide or propylene sulfide by salts such as potassium thiocyanate dissolved in tetrahydrofuran, and that of isobutene sulfide by potassium acetate in benzene solution.

The present invention also relates to the preparation and use of new initiators for anionic polymerization which can be used in solvents of very low dielectric constant. Thus it is possible to envisage the preparation of solutions of metals of group I, in nonpolar solvents, as well as the organic complexes derived therefrom.

Hitherto, since the metals were insoluble in non-polar solvents or very slightly soluble in slightly polar solvents (such as tetrahydrofuran or dioxan), the polymerization reaction could only be carried out in a heterogeneous medium, thus giving rise to polymers of relatively broad molecular weight distribution. Furthermore, in the case of copolymerization these systems resulted in a not insignificant percentage of homopolymer.

The action of the macro-heterocyclic compounds I is to allow the metals to be dissolved in non-polar solvents as well as in slightly polar solvents.

The solutions thus obtained are very active as initiators of the anionic polymerization of the monomers described in the present invention.

Table III gives some examples of initiator solutions.

TABLE III

| Metal | Macro-heterocyclic compound | Solvent |
|---|---|---|
| Na | [221] or [222] | Benzene or |
| K | [222] or [22p] | toluene or |
| Rb | [222] or [322] | tetrahydrofuran or |
| Cs | [222] or [322] | dioxan or tetrahydropyran |

The solutions of dissolved metals described in the present invention are obtained by adding a given amount of macro-heterocyclic compound I to a metal film or to a finely divided metal in an organic solvent.

This preparation can be carried out at ambient temperature and at ordinary pressure as well as under low pressure in the case of benzene and of dioxan and at a low temperature if the solvent permits this (for example tetrahydrofuran and toluene); the solutions obtained being more stable at a low temperature.

Before use, these solutions are filtered so as to remove the undissolved excess metal.

Furthermore, the value of initiation by complexes formed between aromatic hydrocarbons and alkali metals is considerable; in fact, as this initiation takes place by electron transfer, it leads to the formation of difunctional polymers. However, their use has been limited to a restricted number of solvents because they cannot be prepared in solvents of low dielectric constant; these compounds have in general been obtained by reaction between an alkali metal and a polycyclic hydrocarbon in certain ethers (tetrahydrofuran, dimethoxyethane or diethyl ether), as these latter permit solvation of the cations.

The macro-heterocyclic compounds make it possible to prepare these initiators easily even in non-polar solvents.

In order to do this, it is possible to use the solutions of metals described above in the presence or absence of the metal film or finely divided metal; in the former case, the organo-metallic complex forms simultaneously in the solution (homogeneous medium) and on the film (heterogeneous medium); in the latter case, the reaction takes place solely in a homogeneous medium.

The aromatic compound must have a sufficient electron affinity that it captures the peripheral electron of the alkali metal to give an ion radical; the capture of a second electron leading to the formation of a dicarbanion. This aromatic compound is preferably biphenyl, naphthalene, phenanthrene, pyrene and anthracene.

The present invention also relates to the preparation, in non-polar solvents, of initiators such as the living oligomer of α-methylstyrene or of 1,1-diphenylethylene; these initiators have hitherto only been obtainable in a polar medium.

The complexes thus obtained are excellent initiators of the anionic polymerization.

The preparation of naphthalene-sodium and of naphthalene-potassium in a benzene medium, in the presence of a macro-heterocyclic compound, is described below.

The solution of alkali metal in benzene or another solvent is prepared in the same way as described previously.

The sublimed napthalene is added to this solution, in excess or in equimolecular amount relative to the macro-heterocyclic compound. The latter immediately assumes a characteristic green coloration of the ion radical of naphthalene. Spectroscopic measurements in the ultraviolet and visible have confirmed that the ion radical corresponding to the aromatic hydrocarbon used is indeed formed.

The present invention is illustrated by the non-limiting examples which follow:

EXAMPLE 1

Polymerisation of isoprene in the presence of the sodium-compound [221] initiator system in solution in tetrahydrofuran.

The solution of initiator was prepared by adding $10^{-5}$ mol of compound [221] to 30 cm$^3$ of tetrahydrofuran which covered a film of metallic sodium. The sodium dissolved and the solution assumed a dark blue colour. The reaction took place at $-78°$ C. The filtered solution was transferred to another reaction chamber in which $10^{-2}$ mol of 2-methyl-1,3-butadiene were introduced by distillation.

The polymerization was instantaneous and the solution set solid.

The polyisoprene obtained had the following structure:

| | |
|---|---|
| 1,4-addition (total): | 24% |
| 1,2-addition: | 30% |
| 3,4-addition: | 46% |
| Degree of unsaturation: | 80% |
| Intrinsic viscosity [η]dl/g = 5.99 (toluene, 50° C, FICA viscometer) | |

EXAMPLE 2

Polymerisation of isoprene in the presence of the sodium-compound [221] initiator system dissolved in benzene.

A film of sodium was formed in a very high vacuum and a certain amount of benzene (30 cm$^3$) was then allowed to come into contact with the (sodium) mirror. The addition of the compound [221] ($2 \times 10^{-4}$ mol) was accompanied by the appearance of a coloured solution, with disappearance of the metal film. Isoprene in the amount of $2.5 \times 10^{-2}$ mol was added to this solution.

The solution was deactivated after 48 hours and a liquid polyisoprene of number average molecular weight Mn = 2,000 (determined by means of a membrane osmometer of the MECROLAB type) was obtained.

EXAMPLES 3 TO 24

These examples relate to the polymerization of olefinic monomers, diene monomers, vinyl monomers and arylvinyl monomers, in this instance ethylene, isoprene, butadiene, 2-vinylpyridine and styrene, in the presence of initiator systems consisting of (a) a metal of group I or II (Na, K or Cs) and (b) a macro-heterobicyclic complex-forming agent dissolved in a non-polar or slightly polar solvent (benzene, toluene, hexane-benzene or tetrahydrofuran) in accordance with the process described in the preceding examples. The polymerization conditions and the results are indicated in the attached table IV.

EXAMPLE 25

Polymerization of ethylene oxide in the presence of the sodium-compound [222] initiator system in solution in tetrahydrofuran.

The solution of initiator was prepared by adding $1.03 \times 10^{-4}$ mol of compound [222] to 28 cm³ of tetrahydropyran which covered a very thin film of metallic sodium. The metal dissolved and the solution assumed a dark blue colour. The infra-red spectrum of the solution showed a characteristic band at 1,250 cm$^{-1}$. Then $4 \times 10^{-2}$ mol of ethylene oxide were added to this solution. The solution decolorised, and set solid, instantaneously.

EXAMPLE 26.

Polymerization of styrene at ambient temperature in a benzene medium over a film of lithium in the presence of compound [211].

Compound [211] in the amount of $4.8 \times 10^{-5}$ mol was added to 50 cm³ of benzene in a chamber under a vacuum of $10^{-5}$ mm Hg, and the solution was brought into contact with a film of lithium. Styrene in the amount of $2 \times 10^{-2}$ mol was then added thereto at ambient temperature. An instant increase in the viscosity of the solution was observed. The polymerization was continued for 24 hours, after which the solution was deactivated by adding methanol.

The polymer was precipitated in methanol and dried to constant weight. The yield was 100%. $M_w = 6.5 \times 10^6$ Intrinsic viscosity $[\eta] = 4.23$ dl/g (toluene, 50° C) gyration radius = 2,000 A

EXAMPLE 27.

Polymerization of styrene at low temperature in a tetrahydrofuran medium over a film of lithium in the presence of compound [211].

Compound [211] in the amount of $4.4 \times 10^{-5}$ mol was added to 30 cm³ of tetrahydrofuran, covering a film of lithium, under a high vacuum and $2 \times 10^{-2}$ mol of styrene were then added thereto at −80° C. The instant appearance of a yellow colour and an increase in viscosity were observed. After 5 days' polymerization, the solution was deactivated by adding methanol. The polymerization yield was 100%. $M_w = 1.6 \times 10^6$ Viscosity $[\eta]$dl/g = 1.49 in toluene at 50° C Gyration radius = 800 A

EXAMPLE 28.

Polymerization of isoprene in the presence of the metallic potassium-compound [222] initiator system in a benzene medium.

Isoprene (representing $3 \times 10^{-2}$ mol) were added to a solution of 12.5 mg (representing $3 \times 10^{-5}$ mol) of compound [222] in 30 cm³ of benzene covering a film of metallic potassium.

The polymerization was initiated instantly at the surface of the metal film.

The polymer obtained had the following micro-structure:

| Degree of unsaturation: | 97.5% |
|---|---|
| 1,4-addition (total): | 37% |
| 3,4-addition: | 36% |
| 1,2-addition: | 27% |

A great increase in 1,4-trans-addition, 3,4-addition and 1,2-addition compared to what was observed in the absence of the complex-forming agent was noted.

EXAMPLE 29.

Polymerization of isoprene initiated by potassium in a tetrahydrofuran medium in the presence of compound [222].

Compound [222] in the amount of $5 \times 10^{-6}$ mol dissolved in 53 cm³ of tetrahydrofuran was added to $10^{-5}$ mol of potassium hydroxide dried under a high vacuum. Isoprene in the amount of $4.2 \times 10^{-2}$ mol was added to this solution at 25° C. The polymerization was instantaneous, with a yield of 100%.

The NMR analysis carried out on this polyisoprene gave the following results:

| 1,2-structure: | 28% |
|---|---|
| 3,4-structure: | 60% |
| 1,4-structure: | 12% |

EXAMPLE 30.

Polymerization of hexamethylcyclotrisiloxane initiated by KOH in the presence of compound [222] in benzene.

Potassium hydroxide 3.15 mg (representing $5.6 \times 10^{-5}$ mol) previously dried by heating in vacuo for 6 hours were introduced into a flask in vacuo.

Purified benzene, 35 cm³ followed by 6,1.10$^{-5}$ mol of compound [222] (representing $6.1 \times 10^{-5}$ mol) were then introduced, whilst continuing to work in vacuo. The medium still contained heterogeneous particles. $5 \times 10^{-2}$ mol of hexamethylcyclotrisiloxane were now introduced. The medium became viscous instantly. The polymerization was stopped after 5 minutes at 20° C by introducing acetic acid, which was allowed to react for 5 hours. A hexamethylcyclotrisiloxane polymer was obtained in a yield of 55%.

Viscosity of the polymer: $[\eta]$dl/g at 30° C in toluene: 11.6.

$M_w$ (weight average molecular weight): 7,200,000 (measured by light scattering).

EXAMPLE 31.

Polymerization of β-propiolactone initiated by potassium hydroxide in the presence of compound [222] in a benzene medium.

Potassium hydroxide, 2.7 mg ($4.8 \times 10^{-5}$ mol) was introduced into a flask in vacuo and dried by heating in vacuo for several hours. Benzene 23 cm³ were then introduced into the flask in vacuo, followed by 35.5 mg of compound [222] ($9.4 \times 10^{-5}$ mol). A solution 6.6×10$^{-2}$ mol β-propiolactone in 22 cm$^3$ of benzene (thus making a total of 45 cm$^3$ of benzene) was then introduced at 20° C, whilst continuing to work in vacuo. The polymerization was stopped after 24 hours at 20° C by adding methanol. The polymer obtained was precipitated in hexane. It was partially soluble in benzene.

Yield: 61%.

Viscosity of the polymer [η]CHCl$_3$ at 25°: 0.65 dl/g

EXAMPLE 32.

Polymerization of styrene in the presence of the sodium tertiary amylate compound [222] initiator system in a benzene medium.

Sodium tertiary amylate was prepared by heating a solution of 15 cm$^3$ of benzene, containing 1.8 g of tertiary amyl alcohol and 1 g of sodium under reflux. After filtering the mixture, the macro-heterobicyclic compound [222] was added in a given ratio and the lower phase of the mixture was removed and used as an initiator solution. Sodium tertiary amylate – compound [222] in the amount of 10$^{-4}$ mole was dissolved in 30 cm$^3$ of benzene. Styrene in the amount of 2×10$^{-2}$ mol was added thereto at ambient temperature. The reaction was complete after 24 hours.

EXAMPLE 33.

Polymerization of styrene in the presence of the system potassium tertiary butylate compound [222] in a benzene medium.

Potassium tertiary butylate in the amount of 10$^{-4}$ mole was added to 10$^{-5}$ mol of macro-heterobicyclic compound [222] in 30 cm$^3$ of benzene. The solution obtained was perfectly homogeneous. 2×10$^{-2}$ mol of styrene were added at ordinary temperature. The reaction was complete after 48 hours.

In the absence of complexing agent, initiation by alkali metal alcoholates proved completely impossible in the case of styrene.

EXAMPLE 34.

Polymerization of propylene sulfide in the presence of the potassium thiocyanate-compound [222] initiator system, in solution in tetrahydrofuran.

Previously purified tetrahydrofuran in the amount of 30 cm$^3$ followed by 5.6mg (1.5×10$^{-5}$ mol) of 4,7,13,16,21,24-hexaoxa-1,10-diazabicyclo[8,8,8]hexacosane, or compound [222], previously dried in vacuo, were introduced into a flask kept in vacuo and containing 3 mg (3×10$^{-5}$ mol) of dry potassium thiocyanate KCNS (dried beforehand for one day at 60° under a high vacuum). The solution obtained was homogeneous. The flask was then cooled to −40° C and 2 g (2.7×10$^{-2}$ mol) of propylene sulfide were introduced by distillation into the reaction medium. The mixture was allowed to return to ordinary temperature. After 72 hours' polymerization at 20° C in a vacuum of 10$^{-6}$ mm of mercury, the medium became very viscous. The thiolate groups at the ends of the polymer chains obtained were then converted into more stable thioether groups by reaction with excess ethyl bromide. The polypropylene sulfide thus obtained was recovered by precipitation in methanol and was then dried in vacuo.

Yield: 100%.

M$_n$ (number average molecular weight) measured by osmometry >2 millions.

M$_w$ (weight average molecular weight) measured by light scattering: 19 millions.

Without complexing agent no polymerization takes place.

EXAMPLE 35.

Polymerization of isobutene sulfide.

This example describes the use of the compound [22B] as a complexing agent in the presence of potassium acetate as an initiator of the polymerization of isobutene sulphide in benzene.

Potassium acetate in the amount of 2.45×10$^{-3}$ g (representing 2.4×10$^{-6}$ mol) was introduced into a flask and dried by heating under a vacuum of 10$^{-5}$ mm Hg for half an hour. Benzene in the amount of 37.5 cm$^3$ was then introduced, followed by 7.75 mg (representing 1.7×10$^{-5}$ mol) of compound [22B]. Isobutene sulfide in the amount of 2.45 cm$^3$ (2.2 g) representing 2.5×10$^{-2}$ mol, was added to this solution by distillation. The reaction was stopped after 19 hours at 20° C and precipitated in hexane.

The weight of the dried polymer was 1.56 g, representing a yield of 70%. The melting point of the polymer was 188° C.

EXAMPLE 36.

Polymerization of isoprene initiated by the system n-butyl-lithium-compound [222] in a benzene medium.

The macro-heterobicyclic compound [222] in the amount of 2×10$^{-4}$ mole was added to 5×10$^{-4}$ mol of n-butyl-lithium in 50 cm$^3$ of benzene. Isoprene (4.2×10$^{-2}$ mol) was added to this solution at a temperature of 25° C.

The polymerization was extremely rapid and the yield was 100%.

The structure of the polyisoprene obtained, determined by nuclear magnetic resonance spectroscopy, NMR, was the following:

| Degree of unsaturation: | 100% |
|---|---|
| 1,4-cis addition: | 44% |
| 1,4-trans addition: | 34% |
| 3,4-addition: | 22% |

It was found that the presence of the macro-heterobicyclic compound considerably changed the structure of the polymer obtained. In fact, in the absence of complexing agent the structure would have been the following:

| 1,4-cis addition: | 75% |
|---|---|
| 1,4-trans addition: | 12% |
| 3,4-addition: | 7% |

EXAMPLE 37.

Polymerization of isoprene initiated by the system n-butyl-lithium-compound [222] in a tetrahydrofuran medium.

Compound [222] (5×10$^{-6}$ mole) in 50 cm$^3$ of tetrahydrofuran, followed by 4.2×10$^{-2}$ mol of isoprene, were added to 10$^{-5}$ mol of n-butyl-lithium. The polymerization temperature was 25° C. The polymerization was instantaneous and the yield was 100%. The same reaction carried out in the absence of a complexing agent requires 87 seconds for the same degree of conversion.

The micro-structure of the polymer was determined by NMR and gave the following results:

| Degree of unsaturation: | 75% |
| 1,4-addition (total): | 15% |
| 1,2-addition: | 27% |
| 3,4-addition: | 58% |

EXAMPLE 38.

Polymerization of methyl methacrylate initiated by the system n-butyl-lithium-compound [222] in benzene solution Normal-butyl-lithium ($1.5 \times 10^{-5}$ mole) was added to $10^{-5}$ mol of compound [222] in 50 cm$^3$ of benzene. Then, $2 \times 10^{-5}$ mol of methyl methacrylate were added at a temperature of 25° C. The polymerization time is 24 hours.

EXAMPLE 39.

Copolymerisation of styrene and isoprene initiated by the system t-butyl-lithium-compound [222] in a benzene medium.

At first $6.8 \times 10^{-5}$ mol of t-butyl-lithium were sublimed onto a cold finger and then dissolved in 90 cm$^3$ of benzene and $5 \times 10^{-4}$ mol of macro-heterobicyclic compound [222] were added thereto. Then $1.6 \times 10^{-2}$ mole of styrene were then added thereto and after the addition was complete a further $1.2 \times 10^{-2}$ mol of isoprene were added.

Ratio styrene/isoprene in mols, calculated: 57/43
Ratio styrene/isoprene in mols, found : 60/40
(the ratio having been determined by NMR).
The reaction ws complete after 60 minutes.

EXAMPLE 40.

Polymerization of ethylene oxide initiated by the system carbazyl-potassium-compound [222] in tetrahydrofuran.

The compound [222] was introduced into a flask kept under a vacuum and containing a solution of carbazyl-potassium in tetrahydrofuran in an amount slightly in excess of the equimolar amount relative to the initiator (ratio [222]/[K$^+$] = 1.2), so as to give a concentration of active centres [C] = $9.3 \times 10^{-4}$ mole/liter.

Into 30 ml of this solution of carbazyl-potassium complexed by the compound [222], in tetrahydrofuran, was introduced $2.10^{-2}$ mol ethylene oxide (concentration [M] = 0.67 mol/l) at 20° C. After 24 hours at 20° C, the polymerization was stopped by adding methanol to the reaction mixture; the polymer was obtained in a yield of 100%.

M$_n$ (measured by osmometry) = 88,000 (theoretical M$_n$ = 89,000).

On the other hand, to achieve comparable yields of poly(ethylene oxide) in the absence of the complexing agent, it was necessary to heat solutions containing about 1 mol/l of ethylene oxide and $10^{-4}$ mol/l of active centres for 4 to 5 days at 40° C if only the counter-ion potassium was used. The propagation velocity is considerably increased in the presence of compound [222].

EXAMPLE 41.

Polymerization of cyclohexene sulphide.

This example describes the polymerization of cyclohexene sulfide initiated by living polypropylene sulfide which is obtained by polymerization of propylene sulphide initiated by carbazyl-sodium in the presence of the compound [402S] in a tetrahydrofuran medium.

Preparation of polypropylene sulfide:

At first $3.3 \times 10^{-5}$ mol of carbazyl-sodium per liter were introduced into 27.8 cm$^3$ of tetrahydrofuran in a flask in vacuo. Then $2.3 \times 10^{-5}$ mol of the macro-heterocyclic compound [402S] were added to this solution. Then $7.7 \times 10^{-3}$ mol of propylene sulfide were then introduced at 20° C, whilst continuing to work in vacuo.

Polymerization of cyclohexene sulfide:

An amount of $2.3 \times 10^{-2}$ mol of cyclohexene sulfide were introduced in vacuo. The polymerization was stopped after 12 hours by the addition of hexane. The yield of polymer was quantitative.

EXAMPLE 42.

Polymerization of propylene sulfide.

This example describes the use of the compounds [221] and [222] as complexing agents in the presence of carbazyl-sodium and naphthalene-sodium as initiators of the polymerization of propylene sulfide in tetrahydrofuran.

The polymerization was carried out under a vacuum of $10^{-6}$ mm of mercury at −30° C.

The value of the complexing agents in the anionic polymerization of propylene sulfide is demonstrated by the following tests:

The propagation velocity of the propylene sulfide in tetrahydrofuran was measured by dilatometry in vacuo, firstly with the counter-ion sodium (Na$^+$) complexed by the compound [221] and secondly with the counter-ion sodium complexed by the compound [222].

In both cases kinetic measurements were carried out on solutions of "seeds" or of "living polymer" consisting of solutions of poly(propylene sulphide) of low degree of polymerization (number average degree of polymerization DP$_n$ = about 250), to which the complexing agent was added in a stoichiometric amount relative to the concentration of Na$^+$ ions, just before the measurements. These seed solutions were prepared:

firstly, by the action of carbazyl-sodium on a small amount of propylene sulfide in tetrahydrofuran (the solution being intended for use with the compound [221]), and secondly, by the action of naphthalene-sodium on a small amount of propylene sulfide in tetrahydrofuran (the solution being intended for use with the compound [222]).

The results obtained are collected together in Table V below.

Comparison results obtained with the counter-ion Na$^+$ (a test with the initiator only, without the complexing agent) and with the counter-ion tetrabutyl-ammonium NBu$_4^+$ (solution prepared from propylene sulfide and fluorenyl-tetrabutyl-ammonium) are also shown.

TABLE V

| Kinetics of the anionic polymerization of propylene sulfide (solvent — THF; temperature: − 30° C) | | | |
|---|---|---|---|
| Counter-ion | [C] mol/l | [M] mol/l | $\frac{V_p}{(M)}$ sec$^{-1}$ |
| Na$^+$ | $2.30 \times 10^{-4}$ | 1.170 | $1.48 \times 10^{-5}$ |
| NBu$_4^+$ | $2.10 \times 10^{-4}$ | 0.830 | $54 \times 10^{-5}$ |
| Na$^+$ [222] | $2.15 \times 10^{-4}$ | 0.415 | $231 \times 10^{-5}$ |

TABLE V-continued

Kinetics of the anionic polymerization of propylene sulfide
(solvent — THF; temperature: — 30° C)

| Counter-ion | [C] mol/l | [M] mol/l | $\frac{Vp}{(M)}$ sec$^{-1}$ |
|---|---|---|---|
| Na$^+$ [221] | $2.06 \times 10^{-4}$ | 0.483 | $30.2 \times 10^{-5}$ |

[C] concentration of active thiolate centres
[M] monomer concentration
[Vp] propagation velocity Thus, a spectacular increase in the propagation velocity was observed when the counter-ion Na$^+$ was complexed by [222]. Further, knowing the propagation constant for free ions in THF at −30° C, the theoretical propagation velocity was calculated assuming 100% of free ions in the case of the experiment carried out in the presence of [222], and a value below that determined experimentally was found.

Under the concentration conditions of this experiment, not 100% of the ions were free and instead there was an equilibrium between complexed pairs of ions and free ions. This thus signifies that the reactivity of the complexed pairs of ions is greater than that of the free ions.

EXAMPLE 43.

Polymerization of methyl methacrylate.

This example describes the action of the macro-heterocyclic compounds [221] and [222] on naphthalene-lithium used as the initiator of the polymerization of methyl methacrylate in a tetrahydrofuran medium.

Then 10$^{-5}$ mol of naphthalene-lithium were introduced into 20 cm$^3$ of tetrahydrofuran in a vacuum chamber. $3.5 \times 10^{-5}$ mol of compound [221] or [222] were added to this green solution. 2 g (representing $2.2 \times 10^{-2}$ mol) of methyl methacrylate were then added by distillation to the solution kept at −78° C. After 10 minutes, the solution thickened and gelling was complete after 20 minutes. The yield of polymer was 90%.

The structure of the polymer determined by NMR was as follows:

| Isotactic: | 6.9% |
|---|---|
| Heterotactic: | 38.9 |
| Syndiotactic: | 54% |

EXAMPLE 44.

Polymerization of styrene initiated by the system naphthalene-potassium-compound [222] in benzene solution.

An initiator solution of potassium-compound [222] in benzene solution ws first prepared as described in the earlier Example 25, and naphthalene was then added thereto. The solution immediately turned green, which is the colour characteristic of the system naphthalene-potassium in polar solvents. Ultraviolet spectrophotometric measurements showed an absorption at 325 nm characteristic of this type of initiator.

After $2 \times 10^{-2}$ mol of styrene were added to the benzene solution of naphthalene-potassium; the solution instantly became red, and the viscosity increased considerably. The reaction was instantaneous.

Yield 100%. Molecular weight: $8.2 \times 10^6$.

EXAMPLES 45 to 60

The examples relate to the polymerization of olefinic monomers, diene monomers, vinyl monomers and aryl-vinyl monomers in the presence of initiator systems each consisting of a) an aromatic complex of a metal of group I or II, in the present instances naphthalene-sodium, naphthalene-potassium or an oligomer such as α-methylstyrene-potassium and b) a macro-heterobicyclic complexing agent dissolved in a non-polar or slightly polar solvent. The polymerization conditions and the results are shown in the attached Table VI.

EXAMPLE 61.

Preparation of the dimer of 1,1-diphenylethylene initiated by the system potassium-compound [222] in benzene solution.

This example describes the dimerisation of 1,1-diphenylethylene, the polymerization of which does not go beyond the stage of the dimer, for reasons of steric hindrance, and which can act as a bifunctional initiator.

An initiator solution of potassium-compound [222] in benzene solution was prepared as described in the earlier Example 2. 1,1-Diphenylethylene in the liquid phase was introduced into the initiator solution. The dicarbanion dimer of diphenyl-ethylene formed instantly.

The electronic (sic) absorption spectrum of the dicarbanion dimer showed a maximum at 500 nm comparable with that obtained in a polar solvent such as hexamethylphosphorotriamide and with that obtained with the counter-ion Na$^+$ + [222] in the tetrahydrofuran. The solution is stable for 12 hours.

The compound 1,1-diphenylethylene is added to a solution of the initiator and of $2.5 \times 10^{-4}$ mol of compound [222] in 25 cm3 of benzene. The dimer concentration is $2.5.10^{-4}$ mol, measured by spectrophotometry. $3 \times 10^{-3}$ mole of methyl methacrylate is then introduced in the solution thus obtained.

The polymerization, at 25° C is instantaneous, with a yield of 100 %.

A polymer of molecular weight Mn of 200,000 measured by osmometry for a theoretical molecular weight of 160,000 is obtained.

EXAMPLE 62.

Polymerization of ethylene initiated by the system α-methylstyrene-potassium-compound [222] in a tetrahydrofuran medium.

The "living" tetramer of α-methylstyrne-potassium is prepared by the action of α-methylstyrene, in tetrahydrofuran, on a film of metallic potassium.

The living tetramer $6 \times 10^{-4}$ mol was dissolved in 20 cm of tetrahydrofuran; $6 \times 10^{-4}$ mol of compound [222] were added to this solution.

Ethylene ($4 \times 10^{-3}$ mol), previously purified by bubbling through a hot sodium-potassium amalgam, was then introduced into the initiator solution. After 6 hours' polymerization, the solution was deactivated by adding methanol. A waxy polymer of molecular weight between 12,000 and 16,000 was obtained with a yield of 100%.

TABLE IV

| Example No. | Initiator system Metal film or slices | Initiator system Heterocyclic compound concentration [C](mol) | Solvent | Monomer concentration [M] in mol | Temperature conditions of the polymerization, in °C | Molecular weight or viscosity [η], dl/g at 25° C in toluene | Structure of the polymer | Notes |
|---|---|---|---|---|---|---|---|---|
| 3 | Na | $[221] = 10^{-5}$ | Tetrahydrofuran (THF) | Styrene = $2.1 \times 10^{-2}$ | $-78°$ | $M_w = 12 \times 10^6$ (weight average molecular weight) $[\eta] = 4.13$ | | Radius of gyration = 2,400 A |
| 4 | Na | $[221] = 2 \times 10^{-5}$ | Benzene | Styrene = $2.1 \times 10^{-2}$ | $25°$ | $M_w = 5.5 \times 10^6$ | | Radius of gyration $> 2\,000$ A |
| 5 | Na | $[221] = 2 \times 10^{-4}$ | Benzene | Isoprene = $2.5 \times 10^{-2}$ | $25°$ | $M_n = 2,000$ (number average molecular weight) | | |
| 6 | K | $[222] = 10^{-4}$ | Benzene | Styrene = $2 \times 10^{-2}$ | $25°$ | $M_w = 6.3 \times 10^6$ | | Radius of gyration = 1 800 A |
| 7 | K | $[222] = 5 \times 10^{-6}$ | Benzene | Styrene = $10^{-2}$ | $25°$ | $M_w = 1.7 \times 10^6$ | | |
| 8 | K (inadequate amount) | $[222] = 2.5 \times 10^{-4}$ | Benzene | Styrene = $10^{-2}$ | $25°$ | $M_w = 5.5 \times 10^5$ | | |
| 9 | K | $[222] = 2.5 \times 10^{-5}$ | Benzene | 2-vinyl-pyridine = $10^{-2}$ | 25 | $M_w \approx 10^6$ | | |
| 10 | K | $[222] = 2.5 \times 10^{-5}$ | Hexane/benzene | 2-vinyl-pyridine = $10^{-2}$ | $25°$ | $M_w = 1.6 \times 10^6$ | | |
| 11 | K | $[222] = 10^{-5}$ | THF | Isoprene = $2.5 \times 10^{-2}$ | $-78°$ | | 1,4-addition (total) = 12% 1,2-addition = 27% 3,4-addition = 61% Unsaturation = 94% | |
| 12 | K | $[22p] = 10^{-5}$ | THF | Isoprene = $2.5 \times 10^{-2}$ | $-78°$ | | 1,4-addition (total) = 12% 1,2-addition = 27% 3,4-addition = 61% Unsaturation = 94% | |
| 13 | K | $[222] = 10^{-5}$ | THF | Styrene = $10^{-2}$ | $-78°$ | $Mp = 2.7 \times 10^6$ $[\eta] = 4.3$ | | Radius of gyration = 1180 A |
| 14 | K | $[222] = 2 \times 10^{-5}$ | Toluene | Styrene = $10^{-2}$ | $-40°$ | $M_w = 5 \times 10^6$ | | |
| 15 | K | $[222] = 5 \times 10^{-5}$ | Benzene | Isoprene = $10^{-2}$ | $25°$ | DP > 5 (degree of polymerization) | | |
| 16 | K | $[222] = 10^{-4}$ | Benzene | Butadiene = $10^{-2}$ | $25°$ | DP $\leq$ 50 | | |
| 17 | Na in slices | $[221] = 6 \times 10^{-3}$ | Benzene | Styrene = $10^{-2}$ | $25°$ | | | Polymerization carried out in inert gas ($N_2$ or argon) |
| 18 | Cs | $[222] = 2.5 \times 10^{-5}$ | Toluene | Isoprene = $10^{-2}$ | $25°$ | DP $\leq$ 50 | | |
| 19 | K | $[220] = 8 \times 10^{-5}$ | Toluene | Styrene = $2.10^{-2}$ | $25°$ | $Mp = 10^6$ | | |
| 20 | K | $[T_5\underline{2}O] = 2,5 \times 10$- | Toluene | Vinyl-2 pyridine $10^{-2}$ | $25°$ | $Mp = 10^6$ | | |
| 21 | K | $[222] = 4 \times 10^{-5}$ | THF | Ethylene = $10^{-2}$ | $-40°$ | Polymer of very high molecular weight | | |
| 22 | Ca | $[222] = 4.10^{-5}$ | THF | Styrene = $2.10^2$ | $25°$ | $Mp = 38.10^6$ | | |
| 23 | K | $[22p] = 2,5.10^{-5}$ | Benzene | Styrene = $2.10^{-2}$ | $25°$ | $Mp = 10^6$ | | |
| 24 | K | $[222] = 4.10^{-5}$ | Dioxan | Styrene = $2.10^{-2}$ | $25°$ | $Mp = 10^6$ | | Yield 100% |

TABLE VI

| Example No. | Initiator system Metal | Initiator system Heterocyclic compound [C] (in mol) | Aromatic compound [C] (in mol) | Solvent | Monomer [M] (in mol) | Molecular weight | Notes |
|---|---|---|---|---|---|---|---|
| 45 | Na | $[221] = 10^{-4}$ | Naphthalene = | Benzene | Styrene = | $7.5 \times 10^5$ | T°=25° C (polymerization |

TABLE VI-continued

| Example No. | Metal | Heterocyclic compound[C](in mol) | Aromatic compound [C](in mol) | Solvent | Monomer [M](in mol) | Molecular weight | Notes |
|---|---|---|---|---|---|---|---|
| 46 | Na | $[221]=5\times10^{-5}$ | Naphthalene $= 5\times10^{-5}$ | THF | Isoprene $= 5\times10^{-2}$ | $10^{-4}$ | temperature) $T° = -40°$ C |
| 47 | K | $[222]=2\times10^{-4}$ | Naphthalene $= 2\times10^{-4}$ | Benzene | Styrene $= 2\times10^{-2}$ | $1.3\times10^{6}$ | $T° = 25°$ C |
| 48 | K | $[222]=5\times10^{-5}$ | Naphthalene $= 5\times10^{-5}$ | Dioxan | Styrene $= 10^{-2}$ | $12\times10^{6}$ | $T° = -40°$ C |
| 49 | K | $[222]=3\times10^{-5}$ | Naphthalene $= 10^{-5}$ | Benzene | Isoprene $= 3\times10^{-2}$ | | $T° = 25°$ C Structure: Unsaturation = 92% 1,2-addition = 36% 1,4-addition = 26% 3,4-addition = 38% |
| 50 | K | $[222]=3\times10^{-5}$ | Naphthalene $= 10^{-5}$ | Benzene | Methyl methacrylate $= 2\times10^{-2}$ | | Isotactic == 8% Heterotactic = 39% Syndiotactic = 53% |
| 51 | K | $[222]=2\times10^{-4}$ | Naphthalene $= 2\times10^{-4}$ | Benzene | Butadiene $= 10^{-2}$ | 6,000 | $T° = 25°$ C |
| 52 | K | $[222]=2\times10^{-4}$ | Naphthalene $= 2\times10^{-4}$ | Dioxan | Butadiene $= 10^{-2}$ | 10,000 | $T° = -20°$ C |
| 53 | K | $[222]=2.5\times10^{-4}$ | Naphthalene $= 10^{-4}$ | Toluene | Styrene $= 10^{-2}$ | | $T° = -40°$ C |
| 54 | K | $[222]=10^{-4}$ | α-methylstyrene $= 10^{-2}$ | Benzene | Isoprene $= 3\times10^{-2}$ | 25,000 | $T° = 25°$ C |
| 55 | K | $[222]=5\times10^{-4}$ | α-methylstyrene $= 5\times10^{-4}$ | Benzene | Isoprene $= 3\times10^{-2}$ | DP ≧ 5 | $T° = 25°$ C |
| 56 | K | $[222]=5\times10^{-4}$ | α-methylstyrene $= 5\times10^{-4}$ | Benzene | Butadiene $= 10^{-2}$ | DP ≧ 10 | $T° = 25°$ C |
| 57 | K | $[222]=5\times10^{-5}$ | α-methylstyrene $= 10^{-2}$ | Benzene | Ethylene $= 10^{-2}$ | Polymer of very high molecular weight | $T° = 10°$ C * Insoluble in customary solvents |
| 58 | Na | $[222]=3\times10^{-5}$ | Naphthalene $3\times10^{-5}$ | Benzene | Methyl methacrylate $2\times10^{-2}$ | | $T° = 25°$ C Yield: 90% |
| 59 | Na | $[222]=3\times10^{-5}$ | Naphthalene $3\times10^{-5}$ | Benzene | Isoprene $2\times10^{-2}$ | | $T° = 25°$ C Yield: 30% |
| 60 | K | $[222]=3\times10^{-5}$ | Naphthalene $3\times10^{-5}$ | THF | Methyl methacrylate $2\times10^{-2}$ | | $T° = 25°$ C Yield: 100% |
| 61 | Li | $[222]=3\times10^{-5}$ | Naphthalene $3\times10^{-5}$ | Benzene | Methyl methacrylate $2\times10^{-2}$ | | $T° = 25°$ C Yield: 100% |

What we claim is:

1. A process for the polymerization or copolymerization of heterocyclic monomers through ring opening which comprises polymerizing or copolymerizing at least one heterocyclic monomer structurally capable of anionic polymerization in a non-polar or slightly polar organic solvent medium in the presence of an anionic initiator and of a macro-heterocyclic complexing agent of the general formula I

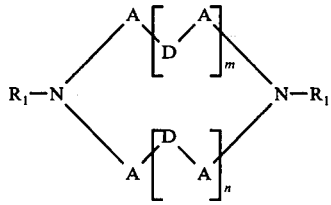

in which:

$R_1$ is a hydrogen atom or a hydrocarbon group or an alkoxycarbonyl group, or the two $R_1$ together can form a group of the general formula:

or

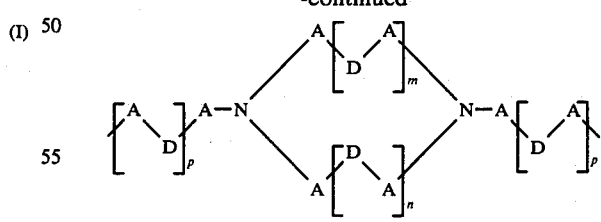

wherein A is a hydrocarbon group, D is an oxygen or sulfur atom or a hydrocarbon group, with the proviso that at least two of the D groups are oxygen atoms or sulfur atoms and that if $R_1$ is a hydrogen atom, a hydrocarbon group or an alkoxycarbonyl group, one of the two D groups is oxygen or sulfur and the other is oxygen, and $n$ and $p$ are integers from 1 to 3 and $m$ is 2 or 3.

2. A process according to claim 1 wherein the macro-heterocyclic complexing agent has the formula:

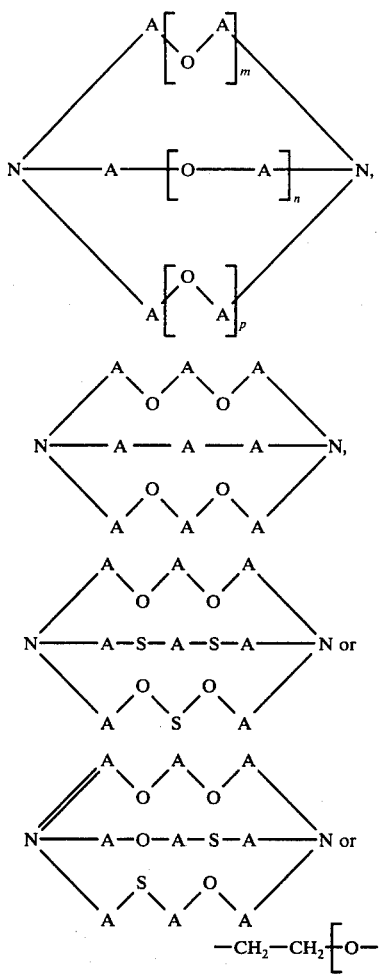

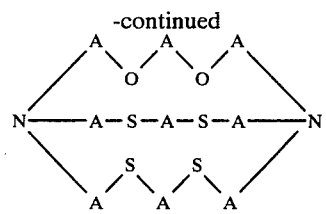

in which A, $m$, $n$ and $p$ are as defined in claim 1.

3. A process according to claim 2 wherein A is $$-CH_2-CHR-, \quad -CH_2-CHR-CH_2-,$$

$$-CHR-CH_2-CH_2-, \quad \text{or} \quad \text{(phenyl)}^R$$

where R is a hydrocarbon radical.

4. A process according to claim 1, wherein the macro-heterocyclic complexing agent has the formula:

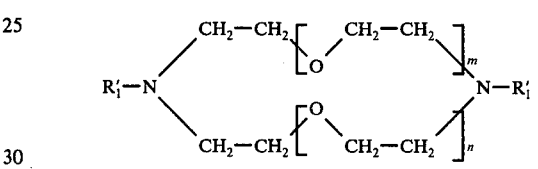

in which the two substituents $R_1'$ together represent one of the following chain links forming a third bridge between the two nitrogen atoms of the molecule:

$$-CH_2-CH_2\left[O-CH_2-CH_2\right]_p \quad \text{or}$$

$$-CH_2-CH_2\left[S-CH_2-CH_2\right]_p \quad \text{or}$$

$$-CH_2-CH_2\left[CH_2-CH_2-CH_2\right]_p \quad \text{or}$$

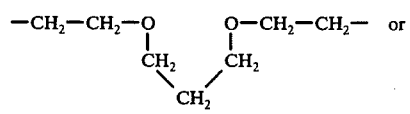

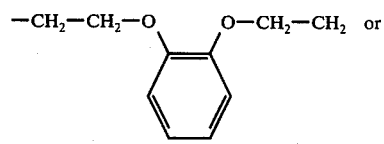

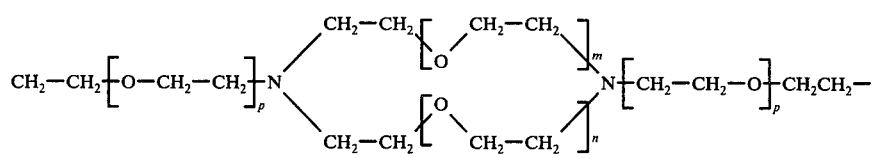

where $n$ and $p$ and $m$ are as defined in claim 1.

5. A process according to claim 4, wherein the macro-heterocyclic complexing agent has the formula

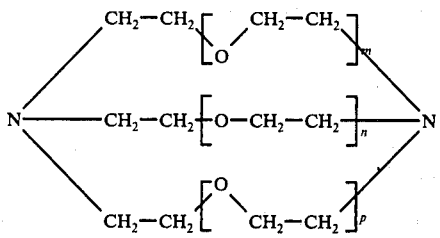

in which n and p and m are as defined in claim 1.

6. A process according to claim 5 wherein the macro-heterocyclic complexing agent is
1,10-diaza-4,7,13,18-tetraoxa-bicyclo[5,5,8]eicosane,
1,10-diaza-4,7,13,16,21-pentaoxa-bicyclo[8,8,5]tricosane,
1,10-diaza-4,7,13,16,21,24-hexaoxa-bicyclo[8,8,8]hexacosane, or
1,13-diaza-4,7,10,16,19,24,27-heptaoxa-bicyclo[8,8,11]nonacosane.

7. A process according to claim 4, wherein the complexing agent is 1,10-diaza-13,16,21,24-tetraoxa-bicyclo[8,8,8]hexacosane.

8. A process according to claim 4 wherein the complexing agent is 1,10-diaza-4,7,13,16,21,26-hexaoxa-bicyclo[8,8,0]heptacosane.

9. A process according to claim 4, wherein the complexing agent is 1,10-diaza,4,7,13,16,21,24-hexaoxa-5,5-benzo-bicyclo[8,8,8]hexacosane.

10. A process according to claim 4, wherein the complexing agent is 1,10-diaza-4,7,13,16-tetraoxa-21,24-dithia-bicyclo[8,8,8]hexacosane.

11. A carbazyl-potassium according to claim 4, wherein the complexing agent is 1,7,16,22-tetraaza-4,10,13,19,25,28,33,36,41,44-decaoxa-tricyclo[20,8$^{1,22}$.8$^{7,16}$]hexatetra-contane.

12. A process according to claim 1, wherein the anionic initiator is:
a metal of group I or II,
a hydroxide of a metal of group I
an alcoholate of a metal of group I or II
an amide of a metal of group I or II of the type

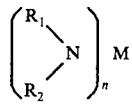

wherein $R_1$ and $R_2$ are hydrogen or an alkyl, cycloalkyl or aryl radical and M is a metal of group I or II, n being the valency of the metal, a compound $MX_n$ wherein
M is a metal of group I or II or of the corresponding subgroup,
n is the valency of the metal, and
X is a thiocyanate or acetate group
a monofunctional or difunctional organo-metallic derivative RM wherein M is a metal of group I or II, and R is an alkyl, cycloalkyl or aryl radical, or
an aromatic complex of a metal of group I or II, or
a living monofunctional or difunctional oligomer or polymer.

13. A process according to claim 12, wherein the anionic initiator is
metallic lithium sodium, potassium caesium,
potassium hydroxide,
an alkali metal t-butylate, t-amylate or n-amylate,
potassium thiocyanate, potassium bromide and potassium acetate,
n-butyl-lithium, t-butyl-lithium, carbaxylpotassium and carbazyl-sodium,
naphthalene-sodium, naphthalene-lithium and naphthalene-potassium, or
α-methylstyrene-sodium or α-methylstyrene-potassium, 1,1-diphenylethylene-sodium or potassium, poly propylene sulfide) sodium and polystyrene-lithium.

14. A process according to claim 1, wherein the non-polar or slightly polar organic solvent is an organic solvent having a dielectric constant not exceeding 10 under normal temperature and pressure conditions.

15. A process according to claim 14, wherein the organic solvent is
a linear or cyclic saturated hydrocarbon,
an aromatic hydrocarbon, or
a linear or cyclic ether.

16. A process according to claim 15, wherein the organic solvent is hexane, heptane, cyclohexane, benzene, toluene, dioxan, diethylether, dimethoxyethane, dimethoxymethane, tetrahydrofuran or tetrahydropyran.

17. A process according to claim 1, wherein the complexing agent is present in at least equimolecular amount, relative to the anionic initiator.

18. A process according to claim 1, wherein the initiator is in a solution which is prepared by reacting the anionic initiator with the complexing agent in a non-polar or slightly polar solvent medium, and then the monomer to be polymerised is added thereto.

19. A process according to claim 18, wherein the initiator solution is prepared by adding the complexing agent to a metal of group I, in the form of a film or in finely divided form, in a non-polar or slightly polar organic solvent, so as to form a solution of the metal, at ambient temperature or below.

20. A process according to claim 18, wherein the solution of initiator is prepared by adding the complexing agent to an alkali metal in a non-polar or slightly polar organic solvent medium so as to form a solution of the said metal, and then adding thereto an aromatic hydrocarbon, to form an aromatic hydrocarbon-alkali metal complex.

21. A process according to claim 20, wherein the aromatic hydrocarbon is biphenyl, naphthalene, phenanthrene, pyrene or anthracene.

22. A process according to claim 19, wherein the metal is sodium, potassium or cesium, the complexing agent is 1,10-diaza-4,7,13,16,21-pentaoxa-bicyclo[8,8,5]-tricosane or 1,10-diaza-4,71,13,16,21,24-hexaoxa-bicyclo[8,8,8]hexacosane and the organic solvent is benzene or toluene.

23. A process according to claim 18, wherein the metal is sodium, potassium or lithium, the complexing agent is 1,10-diaza-4,7,13,16,21,24-hexaoxa-bicyclo[8,8,8]hexacosane, the aromatic hydrocarbon is naphthalene and the organic solvent is benzene or toluene.

24. A process according to claim 18, wherein the initiator is potassium hydroxide, the complexing agent is 1,10-diaza-4,7,13,16,21,24-hexaoxa-bicyclo[8,8,8]hexacosane and the organic solvent is tetrahydrofuran or benzene.

25. A process according to claim 18, wherein the initiator is potassium thiocyanate, the complexing agent is 1,10-diaza-4,7,13,16,21,24-hexaoxa-bicyclo[8,8,8]hexacosane and the solvent is tetrahydrofuran.

26. A process according to claim 18, wherein the initiator is potassium acetate, the complexing agent is 1,10-diaza-4,7,13,16,21,24-hexaoxa-5,6-benzo-bicyclo[8,8,8]hexacosane and the organic solvent is tetrahydrofuran.

27. A process according to claim 18, wherein the anionic initiator is α-methylstyrene tetramer-potassium, the complexing agent is 1,10-diaza-4,7,13,16,21,24-hexaoxa-bicyclo[8,8,8]hexacosane and the organic solvent is tetra-hydrofuran or benzene.

28. The process according to claim 1, wherein the heterocyclic monomer is (a) a compound of the general formula

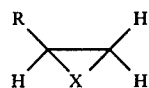 (C)

wherein X is oxygen or sulphur, R being hydrogen, a cycloalkyl or aryl, (b) a cyclohexene sulfide

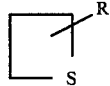

(c) a four-member ring of the general formula

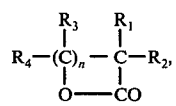

wherein R is alkyl or aryl, (d) a lactone of general formula $$R_4-(C)_n-\underset{\underset{CO}{|}}{\overset{\overset{R_3}{|}}{C}}-\underset{\underset{CO}{|}}{\overset{\overset{R_1}{|}}{C}}-R_2,$$

$n$ being an integer from 1 to 4, each of $R_1, R_2, R_3$ and $R_4$ being H, alkyl, cycloakyl or aryl or (e) a siloxane.

* * * * *